J. A. DODGE.
Harvester Rake.
No. 67,850. Patented Aug. 20, 1867.
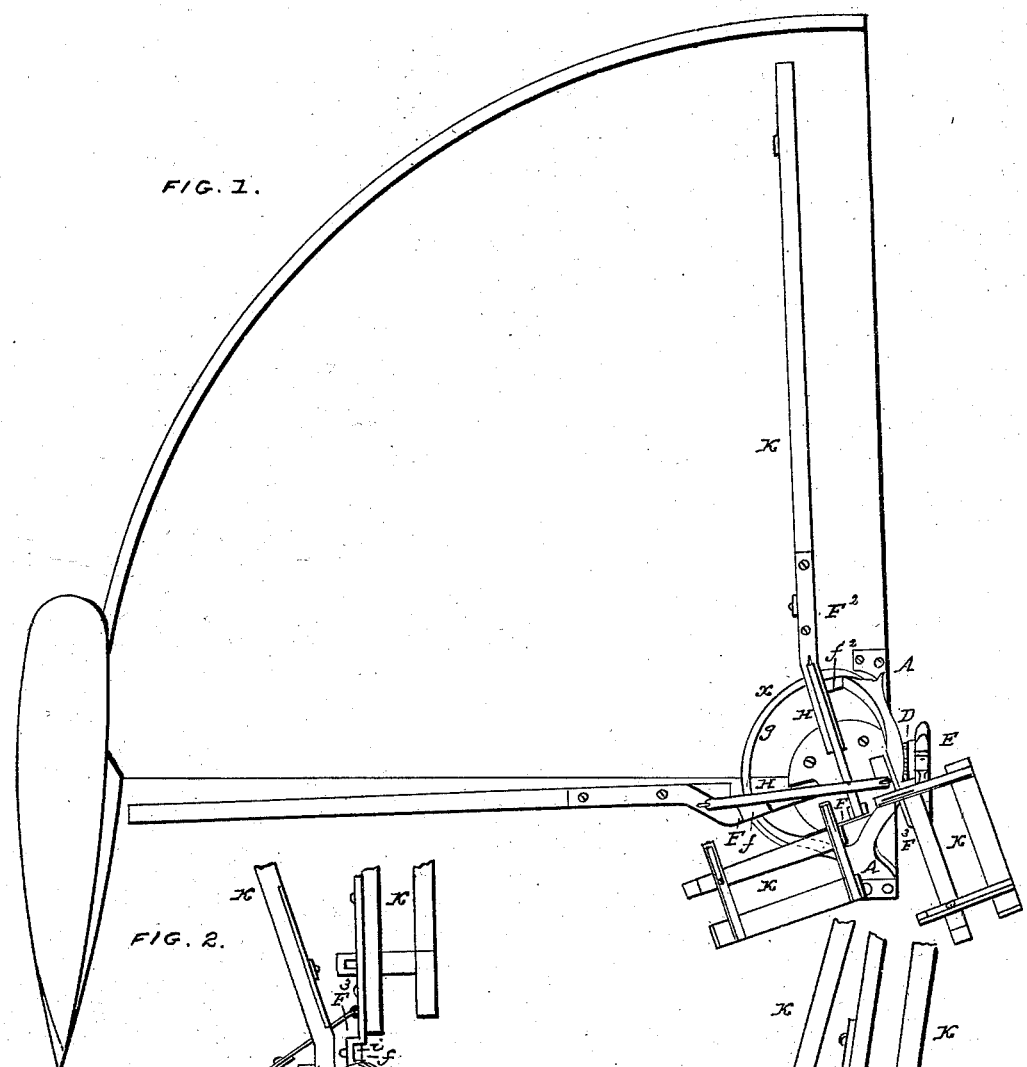
WITNESSES.
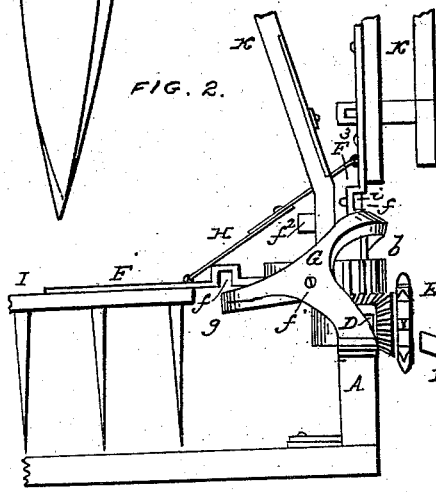
INVENTOR.
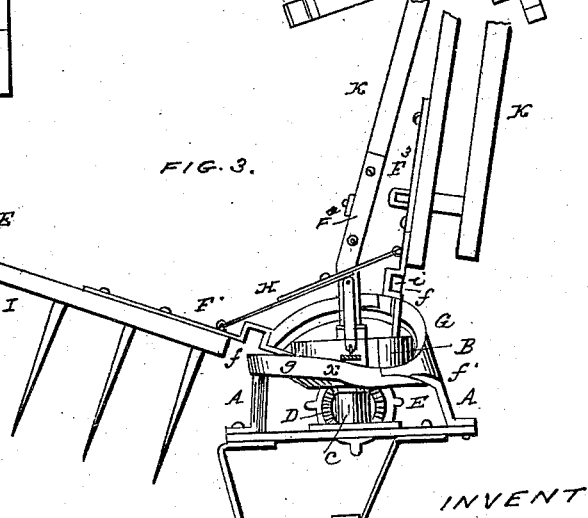

UNITED STATES PATENT OFFICE.

JOHN A. DODGE, OF AUBURN, NEW YORK.

IMPROVEMENT IN HARVESTER-RAKES.

Specification forming part of Letters Patent No. 67,850, dated August 20, 1867.

*To all whom it may concern:*

Be it known that I, JOHN A. DODGE, of Auburn, in the county of Cayuga and State of New York, have invented a new and useful Improvement in Harvesters, of which the following is a full, clear, and exact description, reference being had to the accompanying drawings, which make part of this specification, and in which—

Figure 1 represents a plan or top view of so much of a harvester as is necessary to illustrate my invention, with the rake just beginning to pass over the platform. Fig. 2 shows a view, in elevation, of the raking devices as seen from the front, with the rake in the same position; and Fig. 3, a similar view of the same as seen from the divider side of the machine, with the rake rising from the platform after raking off.

My invention relates to that class of harvester-rakes in which a series of combined rake and reel arms revolving continuously on a vertical axis is employed; and the improvements herein claimed consist, first, in so combining a series of continuously-revolving rakes and reel arms with a guide that the reel-arms or beaters shall be lifted suddenly by the guide after pressing the grain back upon the platform to avoid sweeping off the gavel, while the rake, although traveling in the same track and controlled by the same guide, shall be held down upon the platform while raking off the gavel; second, in so constructing the arms or beaters, having the rising motion above described, that they can be readily altered into rakes, and remain down upon the platform when raking off, thus adapting the rake for efficient action in heavy grain; third, in constructing the rake-arms with an arch or bend, to enable it to pass over the guide without rising from the platform.

It is obvious that my improved rake might be applied to either a one or a two wheeled machine, having either a rigid or a hinged cutting apparatus.

In the accompanying drawings, however, my improved rake is shown as mounted on the inner front corner of a platform, free to rise and fall at either end independently of the main frame. In this instance a frame, A, supports a crown-wheel, B, revolving on a spindle, C, and driven by a bevel-wheel, D, mounted on the same shaft with a sprocket-wheel, E, which may be driven by a chain and pulley from the main axle. A series of arms, $F$ $F^1$ $F^2$ $F^3$, is mounted in the crown-wheel, in bearings which permit them freely to rise and fall. These arms are controlled in their movements by a properly-shaped cam-guide, G, secured to the frame A. The arms $F^1$ $F^3$ have square bends $f$ in them, while the other arms may be made straight. The arms are hinged together in pairs by adjustable links H. A rake, I, is bolted to the arm $F^1$, while the others are provided with beaters or reel-arms K. The arch or recess $f$ in the rake-arm is left open, while the corresponding one in the arm $F^3$ is filled by a detachable block, $i$, held in place by a screw. The beater-arms $F$ $F^2$ $F^3$ are furnished with guide-pieces $f^2$, which rub on the cam-guide while the beaters are elevated, and cause them to maintain their proper relative positions. As the machine progresses, the beater-arms and rake successively enter the standing grain and press it back upon the cutters, which sever it, when it falls upon the platform.

With rakes of this class, when working in heavy grain, the beaters sometimes strike the gavel lying on the platform, and scatter it before the rake comes round. To avoid this I slope the cam-guide G upward at the point $x$, Fig. 3, so that when the beater-arm strikes it, which it only does after having swept the grain back to the cutters, the beaters are suddenly lifted, so as to pass above the gavel without striking it. When, however, the rake comes round, its arch or recess $f$ enables it to pass over the guide without lifting the rake. When the grain is very heavy more than one rake may be required. To meet this want a rake may be attached to the arm $F^3$, and the block $i$ be removed from the arch $f$; the arm will then sweep close to the platform to rake off the grain.

What I claim as my invention, and desire to secure by Letters Patent, is—

1. The combination, substantially in the manner described, of the continuously-revolving rake and reel arms, all traversing the same track and controlled by the same guide, with a guide which lifts the beaters or reel-vanes suddenly after pressing the grain back upon the platform, to avoid disturbing the gavel, while the rake passes over the platform to rake off the grain without being lifted.

2. The combination, as described, of the arch $f$ with the removable block $i$, for the purpose of adapting the beater-arm to be changed to a rake-arm, or vice versa.

3. The arch or bend $f$ in the rake-arm, as and for the purpose described.

In testimony whereof I have hereunto subscribed my name.

JOHN A. DODGE.

Witnesses:
  EDM. F. BROWN,
  J. I. PEYTON.